United States Patent [19]

Carré et al.

[11] Patent Number: 4,533,023
[45] Date of Patent: Aug. 6, 1985

[54] ELASTIC AND SLIDING LOCKING DEVICE FOR DISC BRAKE WITH A FLOATING CALIPER SUPPORTED BY A SINGLE AXIAL PIN, AND DISC BRAKE EQUIPPED WITH SUCH A DEVICE

[75] Inventors: Jean-Jacques Carré, Le Raincy; Pierre Courbot, Villiers le Bel; Jean-Claude Méry, Pavillons Sous Bois, all of France

[73] Assignee: Societe Anonyme D.B.A., Paris, France

[21] Appl. No.: 503,990

[22] Filed: Jun. 13, 1983

[30] Foreign Application Priority Data

Jun. 28, 1982 [FR] France ................. 82 11273

[51] Int. Cl.³ .................................. F16D 55/224
[52] U.S. Cl. .................. 188/73.34; 188/73.38; 188/73.44
[58] Field of Search ........... 188/73.34, 73.32, 73.38, 188/73.35, 73.41, 73.42, 73.43, 73.44, 205 A, 71.1

[56] References Cited

U.S. PATENT DOCUMENTS 3,592,301 7/1971 Auth .................... 188/73.32
3,612,226 10/1971 Pauwels ............... 188/205 A X
3,625,314 12/1971 Rinker .................. 188/73.43 X
4,046,234 9/1977 Kurata ................. 188/73.43
4,134,477 1/1979 Asquith ............... 188/73.44 X
4,181,200 1/1980 Souma ................. 188/73.5

FOREIGN PATENT DOCUMENTS 0036368 3/1981 European Pat. Off. .
0054496 12/1981 European Pat. Off. .
2713360 9/1977 Fed. Rep. of Germany .
2060093 4/1981 United Kingdom .

Primary Examiner—Bruce H. Stoner, Jr.
Assistant Examiner—M. P. Gilday
Attorney, Agent, or Firm—Larry J. Palguta; Ken C. Decker

[57] ABSTRACT

The device (10), mounted elastically for example on a projecting part (30) of the caliper adjacent a projecting part (8) of the fixed support (5), incorporates a flat leaf surface (15) intended to be interposed between the cooperating slide surfaces of the caliper (31) and the support (82) and formed at the end of an intermediate leaf zone forming a flexible ramp surface (14) which cooperates, when fitting the caliper into position, with the adjacent part (8) of the fixed support (5) so as to cause the flat surface (15) to deflect and thus ensure automatic locking of the caliper, the unlocking being easily achieved manually by a similar retraction of the flat slide surface (15). The device (10) is made in a single piece from a sheet of stainless spring steel.

18 Claims, 18 Drawing Figures

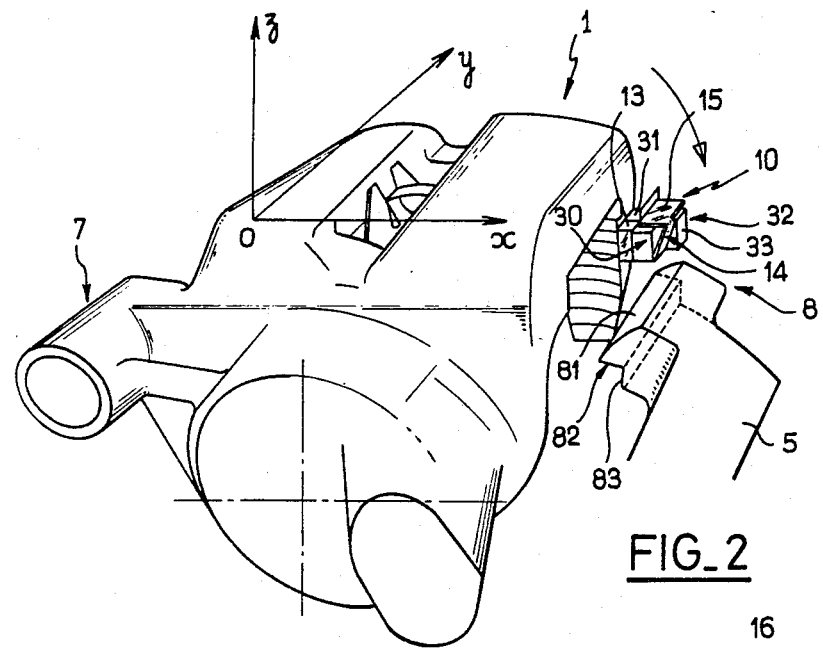

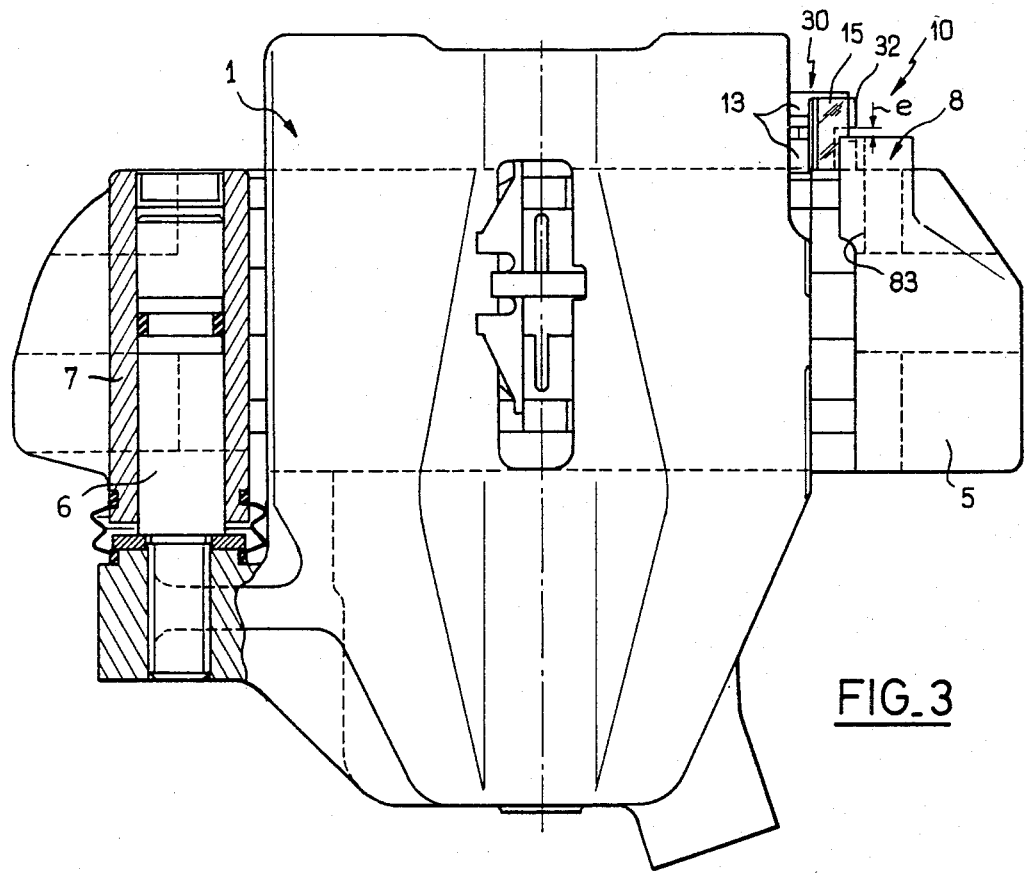
FIG_3
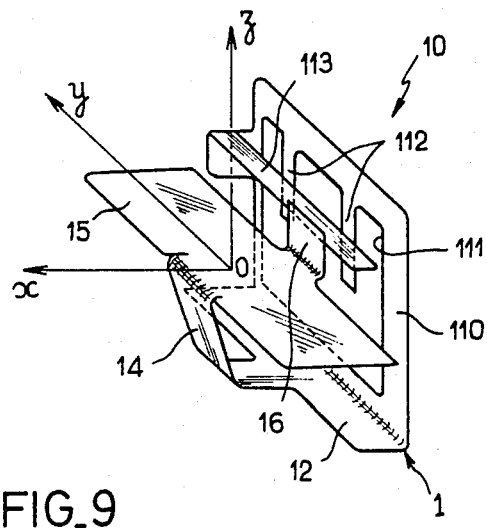
FIG_9

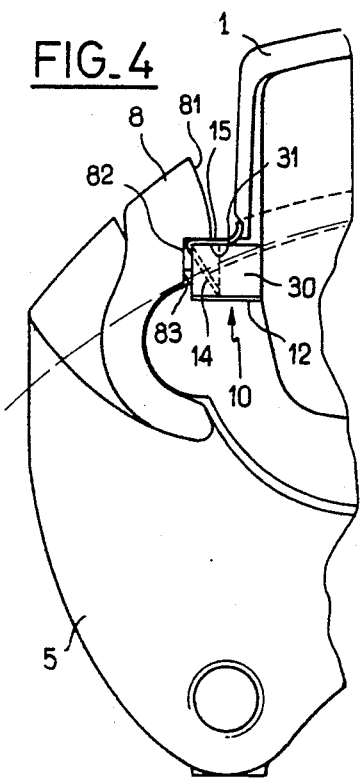
FIG._4
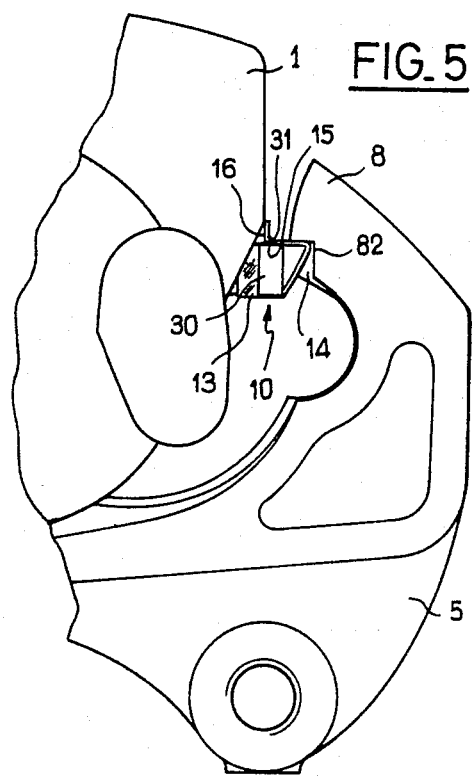
FIG._5
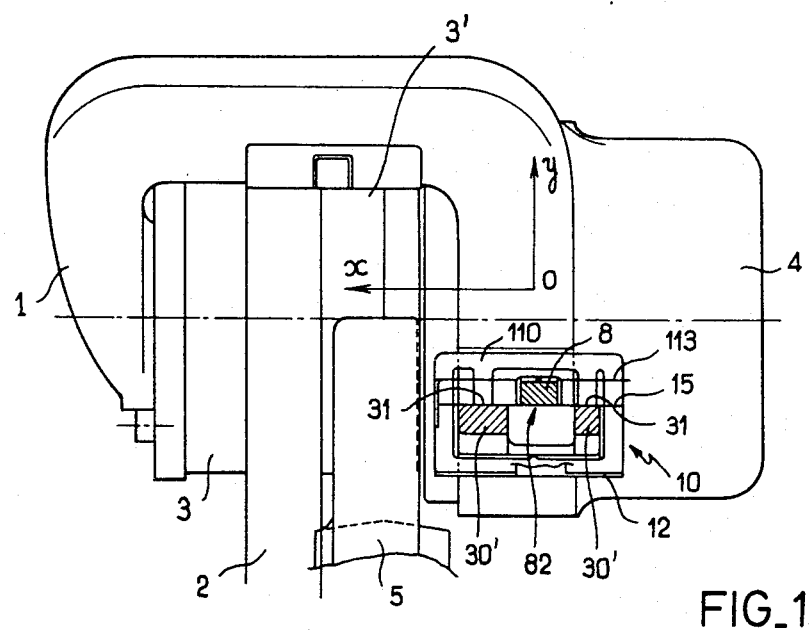
FIG._12

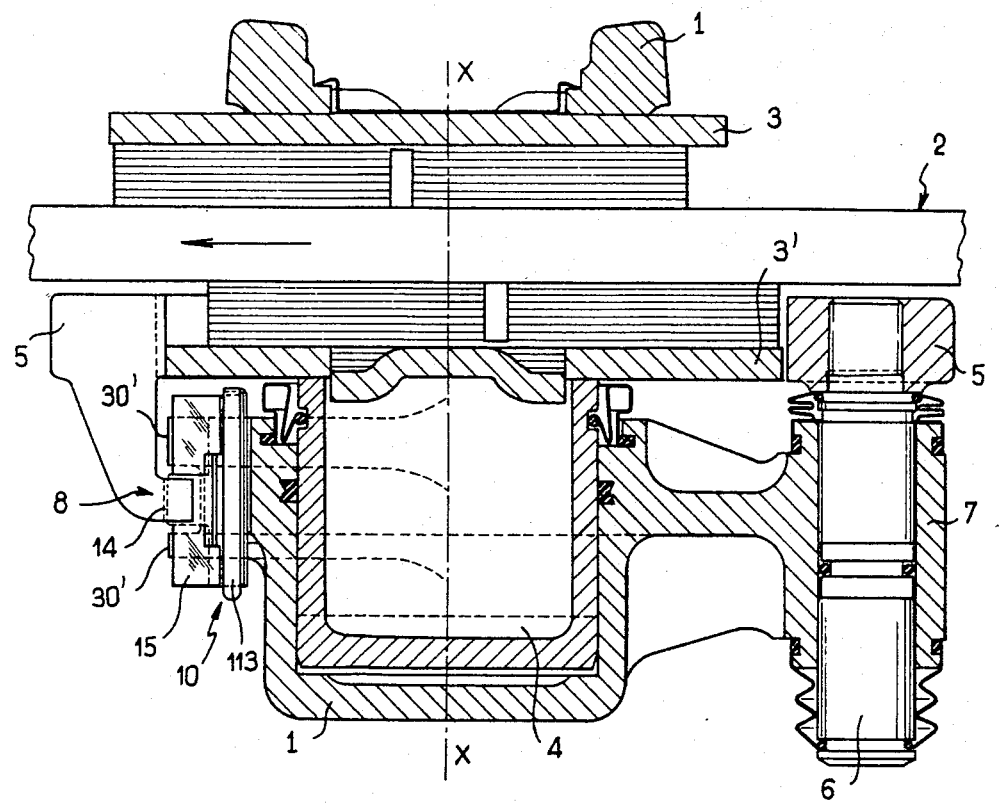
FIG_10
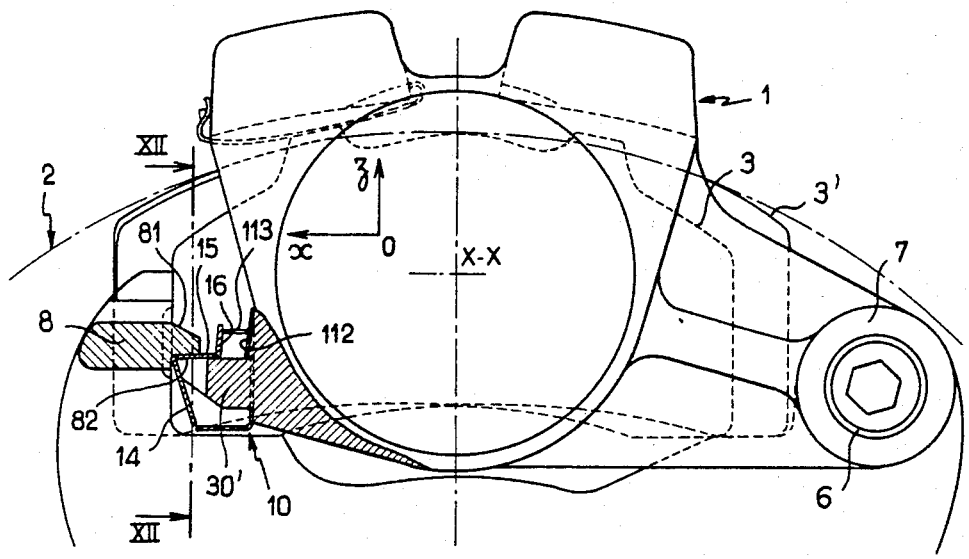
FIG_11

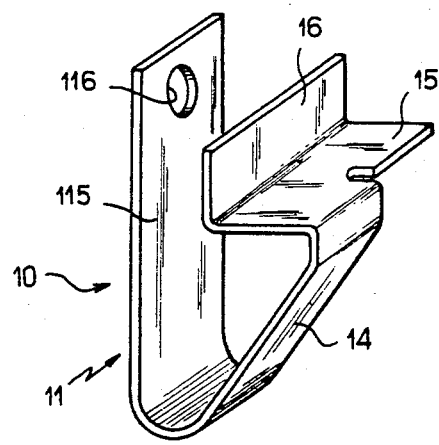
FIG_13
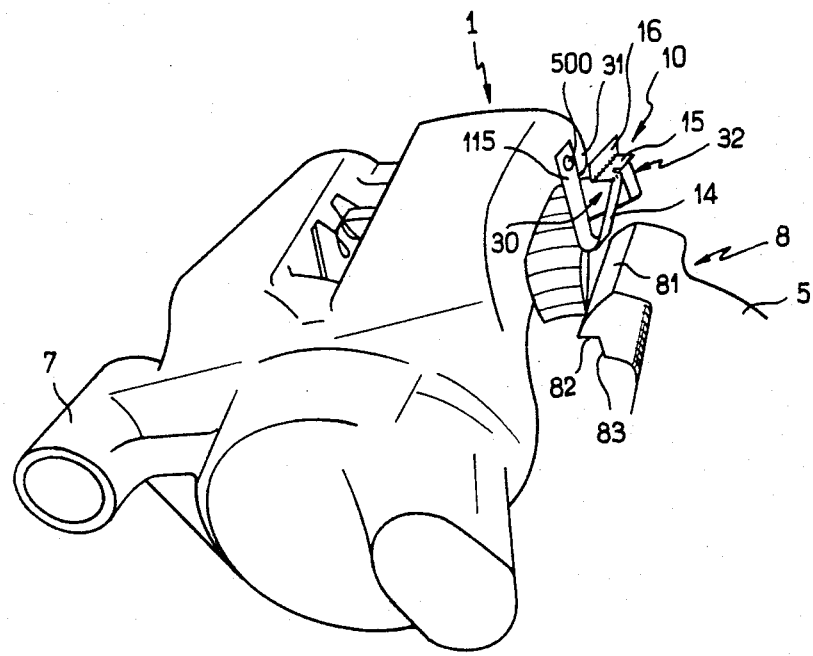
FIG_14

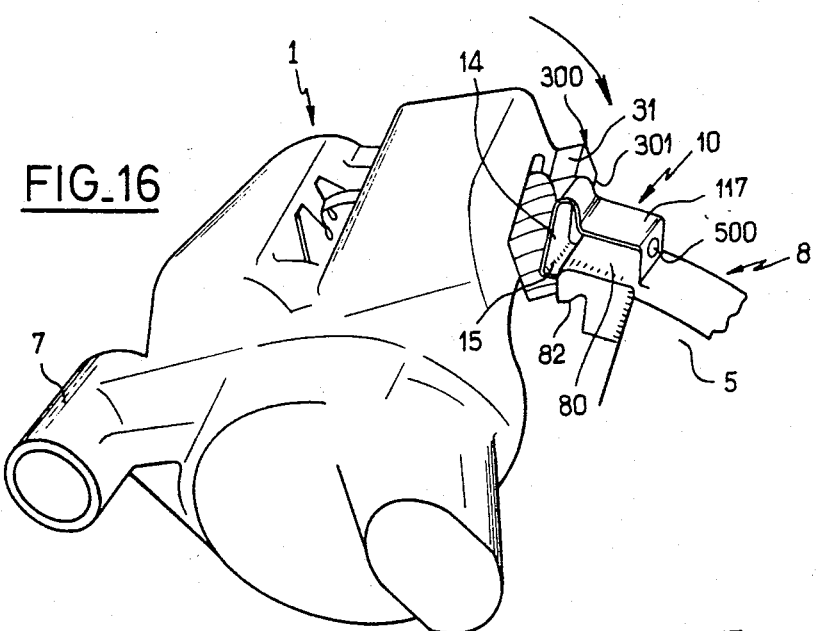
FIG.16
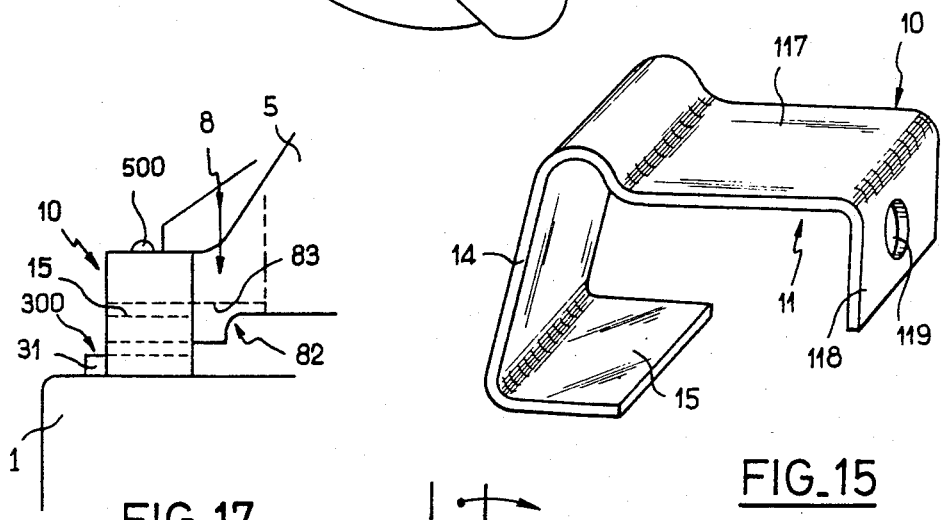
FIG.17
FIG.15
FIG.18

ELASTIC AND SLIDING LOCKING DEVICE FOR DISC BRAKE WITH A FLOATING CALIPER SUPPORTED BY A SINGLE AXIAL PIN, AND DISC BRAKE EQUIPPED WITH SUCH A DEVICE

The present invention concerns disc brakes and, more particularly, elastic sliding and locking devices for disc brakes of the type with a floating caliper slidingly mounted on a fixed support by means of a single axial pin or column firmly fixed to the caliper or to the fixed support, which elastic sliding and locking device is capable of being inserted between one end of the caliper opposite the pin and and adjacent part of the fixed support by being mounted on the first of a pair of components consisting of this end of the caliper and this adjacent part of the fixed support, so as to co-operate in guiding the sliding of the two components relative to one another by coming into contact engagement, over an engagement portion, against adjacent slide zones of each of these two components in the normal operating position of the brake, at least this engagement portion of the sliding and locking device being capable of being deflected, e.g. retracted elastically so as to allow the caliper to pivot about the pin in the vicinity of this normal operating position.

The general construction of a disc brake with a floating caliper sliding on a single pin is described in European Patent Application No. 0,030,502 in the name of the applicant, and whose contents are integrated herewith for reference.

A disc brake of this type, provided with an elastic sliding and locking device of the type defined above, is also the subject of European Patent Application No. 0,036,368, again in the name of the applicant. In this document, the elastic sliding and locking device, with which slidingly cooperate bearing faces of the caliper and of the fixed support which are opposing and are off-set axially, consists of a spring of cylindrical wire having one end fixed to the inside of the caliper and a straight portion running along the length of the end of the caliper opposite the single pin, in such a way that it presents an end of a free arm capable of being retracted, e.g. deflected or displaced towards the caliper when the latter pivots towards its normal operating position, by co-operating with a ramp surface formed on a protruding part, adjacent to this end of the caliper, of the fixed support. The free end of the lateral arm of the spring is locked in an engagement position with the bearing face of the protruding part of the fixed support by a safety pin. Although giving complete satisfaction, this arrangement presents the disadvantage that the sliding zones of the caliper and of the fixed support sliding on the spring wire interposed therebetween are limited to the outlines, e.g. generatrices of the cylindrical spring which may thus groove the material of the caliper, which is generally made of light alloy, for example of aluminum. In addition, the fitting of the spring in position dictates a particular configuration for the end of the caliper, and the safety pin also forms an addtional component which must be fitted or removed when ratchetingly fitting the caliper in position or when subsequently raising it again, for example in order to change the brake pads.

British Pat. No. 1,532,572 on the other hand proposes an arrangement for a brake construction of the type described above which makes use, according to a technique which is well known in conventional disc brakes with a floating caliper, of a retaining and sliding key interposed between the end of the caliper and the adjacent part of the fixed support, thus providing optimum slide surfaces between these two components. However, withdrawing of this key requires the removal of the two safety pins at its two ends and the removal of the key by axial displacement thereof.

One object of the present invention is to propose an elastic and sliding locking device for disc brakes of the type defined above, which is of simple construction, is simple to fit into position and to remove, whose operation is reliable, and which provides improved slide surfaces between the caliper and the fixed support.

To achieve this, according to a feature of the present invention, the elastic sliding and locking device is made from a spring steel sheet, the engagement portion of this device consisting of a flat slide leaf surface connected to a mounting body portion for mounting the device by an intermediate leaf zone forming a flexible inclined ramp surface diverging from the body portion and arranged so as to co-operate with the second relatively sliding component (caliper or fixed support) to achieve the retraction of the engagement portion during the pivoting of the caliper towards its normal operating position.

With this arrangement, the flat engagement portion of the device, with whose opposite faces the slide zones of the caliper and of the fixed support cooperate in sliding engagement, acts as a slide key forming an integral part of a device which further achieves an elastic locking function permitting the caliper to be fitted in place by simple ratcheting at the end of its pivoting movement, while allowing, by simple deflection of the intermediate leaf zone, with a screwdriver for example, the retraction of the engagement portion so as to permit separation of the end of the caliper from the fixed support and to allow the assembly of the caliper and pads to be pivoted about the single pin.

Another object of the present invention is to provide a disc brake of the type defined above, of simple construction and reliable operation, arranged to accept said elastic and sliding locking device.

To achieve this, according to a feature of the invention, in a disc brake of the type defined above, wherein the caliper is provided with a part which projects outward from said end of the caliper in the region of said adjacent part of the fixed support and forming said slide zone of the caliper, the body portion of the elastic and sliding locking device is mounted on the first component in such a way that the intermediate zone forming a flexible inclined ramp surface extends into the region of the projecting part of the caliper towards the second component, with which this flexible intermediate zone can thus cooperate so that it bends when the caliper pivots towards its operating position, thus providing automatic positioning, with locking, of the caliper.

Other features and advantages of the present invention will emerge from the following description of embodiments, given for illustrative and not limitative purposes, with reference to the accompanying drawings, in which:

FIG. 1 is a perspective view of a first embodiment of an elastic and sliding locking device according to the invention;

FIG. 2 shows a disc brake according to the invention equipped with the sliding and locking device of FIG. 1;

FIG. 3 is a plan view partially sectioned of the brake shown in FIG. 2;

FIG. 4 is a partial front view of the inner side of the brake shown in FIG. 3;

FIG. 5 is a partial front view of the outer side of the brake shown in FIG. 3;

FIG. 6 is a diagrammatic plan view of the zone of installation of the device shown in FIG. 1 in the brake according to FIGS. 2 to 5 equipped with new linings;

FIG. 7 is a similar view after the displacement of the caliper resulting from wear of the pad linings;

FIG. 8 is a perspective view of a second embodiment of the device according to the invention;

FIG. 9 is a perspective view of a third embodiment of a device according to the invention;

FIG. 10 is a transverse sectional view of a brake according to the invention equipped with the device shown in FIG. 9;

FIG. 11 is a front view, partially sectioned, similar to FIG. 4, of the brake shown in FIG. 10;

FIG. 12 is a sectional view on the plane XII—XII in FIG. 11;

FIG. 13 is a perspective view of a fourth embodiment of the device according to the invention;

FIG. 14 is a diagrammatic view, similar to FIG. 2, of a brake equipped with the device shown in FIG. 13;

FIG. 15 is a perspective view of a fifth embodiment of the device according to the invention;

FIG. 16 is a diagrammatic view similar to FIG. 14 of a brake equipped with the device shown in FIG. 15;

FIG. 17 is a diagrammatic plan view, similar to FIG. 6, showing the zone of installation of the device in the brake shown in FIG. 16; and FIG. 18 is a diagrammatic end view, similar to FIG. 4, of the installation of the device according to FIG. 15 and showing the manner in which this device, and similarly those of other embodiments, may easily be deflected to allow the caliper to be pivoted.

In the following description and drawings, identical or similar components are identified by same reference numbers, if appropriate with primes.

As shown in the figures, a disc brake of the type with a floating caliper mounted so as to slide on a single axial pin according to the invention consists essentially of a caliper body 1 in which are mounted friction pads 3, 3' either side of a rotating disc 2, and incorporating a hydraulic piston 4 which acts upon the inner pad 3' against the disc 2 and, by reaction, upon the outer pad 3 against the other face of the disc. The caliper 1 is mounted so as to slide on a fixed support 5, for example a yoke, by means of a single axial pin 6 firmly fixed to the caliper or to the fixed support and slidingly received within a tubular housing 7 in the body of the fixed support or of the caliper. In FIGS. 2, 10, 14, and 16 the support pin is fixed to the body of the fixed support 5, while as a variation, in FIG. 3, this support pin 6 is shown to the caliper 1. The end portion of the caliper opposite the pin 6 is normally positioned in the vicinity of an adjacent part 8 of the support body 5, these two adjacent components being arranged to co-operate with an elastic sliding locking device 10 according to the present invention.

For this purpose, the adjacent part of the support body 5 is provided, slightly set back from the outside arm of the caliper 1, with a projecting part 8 which extends axially in the region of the adjacent end of the caliper. This projecting part 8 of the support 5 is provided with an upper inclined surface 81, diverging upwards away from the caliper, extended downwards by a recess which defines a slide surface 82 facing downwards and extending substantially in an horizontal plane, parallel to the axis of the brake disc as embodied by the axes Ox and Oy, and an offset abutment surface 83 which extends in a plane substantially perpendicular to the horizontal plane mentioned above and embodied by the axes Oy and Oz.

In the embodiments shown in FIGS. 1 to 7 and 13 and 14, the end portion of the caliper 1 opposite the support pin 6 is provided with a projecting part 30 extending outwards in a direction opposite to the pin 6 and provided with an upper flat surface 31 arranged so as to extend, in the normal operating position of the brake, in a horizontal plane xy substantially coincident with the horizontal plane of the face 82 of the projection 8 of the fixed support 5, as may be seen more clearly in FIGS. 4 and 5. In these embodiments, the projecting part 30 of the caliper is provided with a thickened installation zone of cubic configuration having a length, outwards, less than the distance normally separating the end of the caliper from the edge of the projecting part 8 of the fixed support 5 as defined by the surfaces 81 and 82.

The projecting part 30 is provided with an end 32 extending outwards laterally relative to the projecting part 8 of the support 5, a clearance e normally being provided between the lateral inner face of the end 32 and the adjacent lateral outer face of the projecting part 8 when the brake is equipped with new linings, as may be seen in FIG. 3. The end 32 terminates in a front face 33 extending, in the normal operating position of the brake, in a plane parallel to the plane yz and thus to the recessed face 83 of the projecting part 8 of the fixed support 5, the outwards extension of the end 32 of the projecting part 30 in the direction x being less than the distance normally separating in this direction x, the offset face 83 from the adjacent end of the caliper 1.

In this way, in the normal operating position, as the brake progressively wears, when the caliper moves relative to the fixed support 5, the projecting part 30 can engage in the recess formed by the faces 82 and 83 of the projecting part 8 of the support 5, as shown diagrammatically in FIG. 7.

In the embodiment of the sliding and locking device 10 according to the invention shown in FIGS. 1 to 7, the latter consists of a body portion 11 which is essentially of cubic configuration with a bottom web 12 and two rear flaps 13 folded to form a closed U, the bottom web 12 being extended outwards by an intermediate leaf zone 14 of reduced width (in the direction y) extending upwards and outwards away from the flaps 13 (in the direction x) so as to form an inclined and flexible ramp surface, this intermediate leaf zone 14 being extended in turn, at its upper end, by a flat leaf surface 15 extending in a plane parallel to that of the bottom web 12 over the whole width (in the direction y) of the device 10. The leaf surface 15 is, in turn, extended by an end portion 16 folded upwards so as to extend in a plane which is essentially perpendicular to that of the leaf surface 15. The whole of the device 10 is made in a single piece from a sheet of stainless spring steel stamped and formed to the configuration shown. This device 10 is fitted into position on the projecting part 30 of the caliper in the manner shown, that is to say by elastically inserting the body portion 11 onto the base of the projecting part 30, the intermediate leaf zone 14 thus extending in the region of the end 32 of the projecting part and the flat leaf surface 15 extending in a plane parallel to that of the upper surface 31 of the projecting part 30, slightly above the latter. As may be seen in FIGS. 6 and 7, the extension in the direction x of the flat leaf surface 15 is such that, the device 10 being mounted on the projecting part 30 of the caliper, the leaf surface 15 extends outwards beyond the edge of the projecting part 8 of the support 5 defined by the faces 81 and 82. However, according to the invention, when the caliper 1 pivots about the support pin 6 in the direction from its desengaged position to its normal operating position, indicated by the arrow in FIG. 2, the intermediate leaf zone 14 forming a ramp surface, comes into contact with the edge of the projecting part 8 and bends about its lower zone of attachment to the bottom web 12 towards the caliper so as to cause in this way the flat leaf surface 15 to be retracted and to permit the completion of the downward pivoting of the caliper. On the other hand, as soon as the plane of the flat leaf slide surface 15 has passed the edge formed by the faces 81 and 82, by virtue of the elasticity of the material of the device 10, the slide surface 15 substantially recovers its initial position in sliding engagement contact with the slide face 82 of the projecting part 8, as may be seen in FIGS. 4 and 5. In accordance with the aim of the invention, the device 10 thus ensures automatic locking of the caliper 1 in its normal operating position relative to the adjacent end 8 of the fixed support 5, whereas the flat leaf surface 15, interposed between the upper face 31 of the projecting part 30 of the caliper and the face 82 of the projecting part 8 of the support 5, which co-operate with the opposite faces of the leaf surface 15, acts as a sliding key "bridging" the two movable components one relative to the other in the initial configuration with the brake provided with new linings, in the same way, ultimately, as the linings wear, when the projecting part 30 of the caliper comes into engagement below the face 82 of the projecting part 8. In this latter configuration, to prevent the caliper becoming skew or tilted when it is displaced, the dimensions of the projecting part 30 of the caliper are arranged so that the front face 33 of the end 32 of this projecting part comes into bearing engagement with the recessed abutment face 83 of the projecting part 8 of the support body. In a preferred embodiment, to prevent, in these conditions, hammering of the end 32 of the projecting part (made of light alloy whereas the support body 5 is typically made of cast iron for example), the body portion 11 of the device 10 is provided with a flap 18 folded upwards from the bottom web 12 adjacent flexible leaf zone 14 and is thus interposed between the front face 33 and the abutment face 83.

The embodiment of the device 10 shown in FIG. 8 differs from that described above, in that the body portion 11, insted of forming a prismatic box fitted over the projecting part 30 of the caliper 1, is prolongated opposite the flexible leaf zone 14, by a web 110 folded upwards relative to the bottom web 12 (and thus parallel to the end portion 16, at a distance therefrom). In the web portion 110 is cut a window 111 of a general rectangular shape with ears 112 extending inwards which apply elastic retaining pressure when the projecting part 30 is force fitted into the window 111. As for the previous embodiment, the web portion 12 may advantageously be provided with a flap 18 folded upwards which extends in front of the front face 33 of the end 32 of the projecting part 30.

In the embodiment shown in FIGS. 9 to 12, the projecting part of the caliper is divided into two portions 30' separated laterally from one another, the projecting part 8 of the fixed support 5 then presenting a reduced lateral width to be interposed, in the normal operating position of the caliper provided with new linings, between these two portions 30' protruding from the caliper, as may be seen in FIGS. 10 and 12. The corresponding sliding and locking device 10 is modified accordingly. It incorporates a body portion similar to that of the embodiment in FIG. 8, the flexible intermediate leaf zone 14 being formed centrally and the flat leaf slide surface 15 extending laterally symmetrically either side of this intermediate flexible zone 14, as may be clearly seen in FIG. 9. In these conditions, as shown in FIG. 12, in the initial configuration, the slide leaf surface 15 co-operates, at its two ends, its lower face with the upper slide surfaces 31 of the two portions 30' of the projecting parts of the caliper, and its upper face centrally with the face 82 of the projecting part 8 of the fixed support 5. According to an aspect of the invention, the body portion 111 forms, in this embodiment, a flexible leaf 113 extending parallel to the plane of the flat surface 15 between the upwardly folded end portion 16, and the end web 110 of the body portion 11 so as to provide in this way a releasable locking for the flat slide leaf surface 15 to prevent undesirable retraction of the latter. Hence as in the preceding embodiments, during the fitting into position of the caliper 1 by pivoting towards its normal operating position, the retraction of the leaf surface 15, resulting from the bending of the flexible intermediate leaf zone 14 co-operating with the projecting part 8 of the fixed support 5, is only permitted on condition that the locking leaf 113 is previously bowed upwards to allow the end portion 16 to clear towards the rear, which otherwise would immediately come into abutment against the locking leaf 113 in its rest position.

A simplified embodiment of the device 10 according to the invention is shown in FIGS. 13 and 14. In this variant, instead of being elastically mounted on the projecting part 30 of the caliper (which is reduced, in this variant, to a parallelepiped of a section corresponding to the end 32), the device 10 has a body portion 11 reduced to a leaf 115 prolongating the flexible intermediate leaf zone 14 and extending in a plane substantially perpendicular to that of the flat leaf surface 15, this leaf portion 115 being provided with a hole 116 for mounting it onto the end of the caliper 1 by means of a splined nail 500.

In the different embodiments described above, the end portion 16 prolongating the flat slide leaf surface 15 of the device 10 serves for unlocking the device so as to release the caliper 1, by pivoting, from the fixed support 5, for example in order to inspect the pads or to replace them. Thus, by applying pressure, with a screwdriver for example, between the edge of the projecting part 8 of the support 5 and this end protion 16 of the device 10, this end portion may thus be pushed towards the caliper, thus releasing the flat leaf surface 15 from the slide face 82 of the projecting part 8 of the support 5 so as to pivot the caliper away from this projecting part 8.

In the embodiment shown in FIGS. 15 to 18, the sliding and locking device 10 is in this case mounted on the projecting part 8 of the support body 5. For this purpose, the projecting part 8 is provided with a boss 80 extending upwards and having an upper flat surface 810 parallel to the plane xy mentioned above and a rear shoulder with a mounting face 820 perpendicular to said face 810. In this embodiment, the device 10 is still provided with a flat leaf surface 15 (not incorporating in this case a folded end portion 16) connected by the intermediate zone 14 forming a flexible ramp to a body portion 11 which is reduced to a flat surface 117 extending into an end flap 118 folded downwards, perpendicular to the latter, towards the flat slide surface 15, and provided with a hole 119. The device 10 is thus installed on the boss 80 with the flat surface 117 bearing against the upper face 810 of the boss and the end flap 118 bearing against the rear face 820 of the boss, to which it is firmly fixed by means of a splined nail or rivet 500 passing through the hole 119. In this embodiment, as may be clearly seen in FIGS. 16 and 18, the projecting part 300 of the caliper 1 is not provided with an end 32 extending laterally, in the normal initial position, next to the projecting part 8 of the support 5, this projecting part 300 being reduced to the root portion of the projecting part 30 of the embodiment shown in FIGS. 1 to 7, that is to say having a reduced extension outwards which permits it to pass through the gap arranged between the end of the body of the caliper 1 and the edge of the adjacent projecting part 8 of the support 5. In this embodiment, during the fitting into position of the caliper by pivoting towards its normal operating position, it is the lower edge 301 of the projecting part 300 which co-operates with the flexible intermediate leaf zone 14 of the device 10 so as to push the flat leaf surface 15 outwards, below the slide face 82, as indicated by the arrow E in FIG. 18, after which, when the upper slide surface 31 of the projecting part 300 has passed the horizontal plane of the leaf surface 15, the latter substantially recovers its initial position for forming a key between the opposing slide surfaces 82 of the projecting part 8 of the support 5 and 31 of the projecting part 300 of the caliper 1 (which, unlike the previous embodiment, as the linings were, no longer comes into engagement below this slide face 82 of the projecting part 8 of the support 5). As illustrated in FIG. 18, to unlock the caliper, it is here only necessary to insert a screwdriver 400 between the flexible intermediate leaf zone 14 and the adjacent end of the caliper body 1 so as to push the sliding and locking flat leaf surface 15 of the device 10 in the direction of the arrow E and thus permit the caliper 1 to pivot away from the support 5.

Although the present invention has been described in relation to particular embodiments, it is not limited by them, but on the contrary is capable of modifications and variants which will be apparent to those skilled in the art.

We claim:

1. An elastic and sliding locking device for a disc brake of the type comprising a floating caliper slidingly mounted on a fixed support by means of a single axially extending pin, the locking device being arranged between one lateral end of the caliper opposite said pin and an adjacent part of the fixed support by being fixedly mounted on a first component of a pair of components consisting of said caliper end and said adjacent part of the fixed support so as to cooperate in guiding the sliding of said two components relative to one another by means of an engagement portion of the device in sliding contact engagement with adjacent slide zones of the respective components in the normal operating position of said brake, at least said engagement portion of said locking device being capable of being retracted elastically so as to allow the caliper to pivot about the pin adjacent said normal operating position, the locking device being made from a spring steel sheet and comprising a mounting body portion for fixedly mounting the device onto said first component, the engagement portion consisting of a flat slide leaf surface connected to said mounting body portion by an intermediate leaf zone forming a flexible inclined ramp surface extending angularly away from said body portion and arranged so as to cooperate in contact engagement with the second component of said pair of components in order to cause a momentary displacement of said engagement portion when said caliper is pivoted to said normal operating position and said engagement portion resiliently returning to be interposed between said adjacent slide zones of the two components.

2. The locking device according to claim 1, characterized in that said engagement portion extends from an end of said intermediate leaf zone opposite said body portion and extending toward said body portion.

3. The locking device according to claim 2, characterized in that the locking device is provided with an end portion for elongating said engagement portion opposite said intermediate leaf zone and extending at an angle relative to the engagement portion.

4. The locking device according to claim 2, characterized in that the body portion comprises a web zone adjacent the intermediate leaf zone and extending essentially parallel to the engagement portion.

5. The locking device according to claim 2, characterized in that the body portion is shaped to be fixedly mounted on an elastic engagement on a projecting part of said first component.

6. The locking device according to claim 5, characterized in that the body portion comprises at least one end leaf zone extending essentially parallel to said end portion for elongating said engagement portion.

7. The locking device according to claim 3, characterized in that the locking device includes releasable locking means normally preventing the retraction of the engagement portion.

8. The locking device according to claim 7, characterized in that said locking means comprises a transverse leaf zone extending normally between said end portion for elongating said engagement portion and said end leaf zone of the body portion.

9. A disc brake incorporating the elastic and sliding locking device in accordance with claim 1, the caliper incorporating a part projecting outwardly from said end of the caliper adjacent said adjacent part of the fixed support and forming said slide zone of the caliper, characterized in that the body portion of the device is mounted on said first component of said pair so that the intermediate leaf zone forming the inclined ramp surface extends adjacent the projecting part of the caliper in a direction toward the second component.

10. The disc brake according to claim 9, in which said adjacent part of the fixed support incorporates a slide face oriented parallel to the axis of the disc and forming said slide zone of the fixed support, characterized in that the device is mounted on said first component of said pair so that, at least in said normal operating position, the engagement portion of the device extends in contact engagement with said slide face.

11. The disc brake according to claim 10, in which the projecting part of the caliper incorporates an upper face forming said slide zone of the end of said caliper, characterized in that in said normal operating position the slide zones of the first and second components bear against the respective opposite faces of said flat slide leaf surface of the locking device.

12. The disc brake according to claim 9, characterized in that in said first component of said pair on which is mounted the body portion of the device is the caliper.

13. The disc brake according to claim 12, characterized in that the body portion of the device is mounted on the projecting part of the caliper.

14. The disc brake according to claim 13, characterized in that the end portion of the device extends along an edge of said adjacent part of the fixed support facing the end of the caliper.

15. The disc brake according to claim 9, characterized in that said first component of said pair of components on which the body portion of the device is mounted is the fixed support.

16. The disc brake according to claim 12, characterized in that the body portion of the device is fixed to the first component by a splined nail.

17. An elastic and sliding locking device for a disc brake of the type comprising a floating caliper slidingly mounted on a fixed support by means of a single axially extending pin, the locking device being arranged between one lateral end of the caliper opposite said pin and an adjacent part of the fixed support by being fixedly mounted on a first component of a pair of components of said lateral end of the caliper and said adjacent part of the fixed support so as to cooperate in guiding the sliding of said two components relative to one another by means of an engagement portion of the device and sliding contact engagement with adjacent slide zones of the respective components in the normal operating position of the brake, at least said engagement portion of the device being capable of being retracted elastically so as to allow the caliper to pivot about the pin adjacent said normal position, the locking device being made from a spring steel sheet and comprising a mounting body portion for fixedly mounting the device onto said first component, the engagement portion consisting of a flat slide leaf surface connected to said mounting body portion by an intermediate leaf zone forming a flexible inclined ramp surface extending angularly away from said body portion and arranged so as to cooperate in contact engagement with the second component of said pair of components in order to cause a momentary displacement of said said engagement portion when said caliper is pivoted to said normal operating position and said engagement portion resiliently returning to be interposed between said adjacent slide zones of said two components, the engagement portion extending from an end of said intermediate leaf zone opposite said body portion and extending toward said body portion, the flat slide leaf surface extending in a plane perpendicular to a vertical plane passing through the axis of the disc and the center of a piston of said caliper, the caliper including a part projecting outwardly from said lateral end of the caliper adjacent said part of the fixed support and having an upper face forming said slide zone of the caliper, said adjacent part of the fixed support including a slide face oriented parallel to the axis of the disc and forming said slide zone of the fixed support, in said normal operating position the engagement portion of the device extending in contact engagement with said slide face, and the slide zones of the first and second components bearing against the respective opposite faces of said flat slide leaf surface of the locking device.

18. The locking device in accordance with claim 17, further comprising an end portion for elongating said engagement portion opposite said intermediate leaf zone and extending at an angle relative to the engagement portion, and an end leaf zone extending parallel to said end portion and being a flat surface with a central opening for receiving said projecting part so that the end zone surrounds said projecting part to mount the locking device thereon.

* * * * *